(12) United States Patent
Marowski et al.

(10) Patent No.: US 7,646,284 B2
(45) Date of Patent: Jan. 12, 2010

(54) SYSTEMS AND APPARATUS FOR WRITING DATA TO MULTIPLE RF TAGS CONTAINED ON PRINT MEDIA

(75) Inventors: Raymond Michael Marowski, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 173 days.

(21) Appl. No.: 10/991,768

(22) Filed: Nov. 17, 2004

(65) Prior Publication Data

US 2006/0104689 A1 May 18, 2006

(51) Int. Cl.
*H04Q 5/22* (2006.01)
(52) U.S. Cl. .................. 340/10.51; 340/10.6; 340/10.3; 340/572.1
(58) Field of Classification Search .............. 340/10.51, 340/10.6, 572.1, 10.3; 235/449, 432, 451; 400/88, 76, 70
See application file for complete search history.

(56) References Cited

U.S. PATENT DOCUMENTS

| | | | |
|---|---|---|---|
| 5,751,220 A * | 5/1998 | Ghaffari | 340/10.2 |
| 6,104,291 A * | 8/2000 | Beauvillier et al. | 340/572.1 |
| 6,246,326 B1 | 6/2001 | Wiklof et al. | |
| 6,487,681 B1 * | 11/2002 | Tuttle et al. | 714/25 |
| 6,593,853 B1 | 7/2003 | Barrett et al. | |
| 6,747,560 B2 | 6/2004 | Stevens, III | |
| 6,750,769 B1 | 6/2004 | Smith | |
| 6,784,789 B2 * | 8/2004 | Eroglu et al. | 340/10.3 |
| 6,802,659 B2 | 10/2004 | Cremon et al. | |

* cited by examiner

*Primary Examiner*—Vernal U Brown

(57) ABSTRACT

Print media (28) having a plurality of radio frequency data storage devices (88) passes through a print media pathway (110) of a printer assembly (14). The devices (88) can be programmed using groups (142, 144) of antennas which are arranged about the print media pathway (110) such the simultaneous programming of multiple devices (88) can be achieved. A data programming device (94) consisting of multiple reader/programmers (94a, 94b, 94c) can be utilized in combination with one or more RF multiplexers (152, 154) to reduce the time necessary to program the devices (88) separately.

23 Claims, 4 Drawing Sheets

SYSTEMS AND APPARATUS FOR WRITING DATA TO MULTIPLE RF TAGS CONTAINED ON PRINT MEDIA

TECHNICAL FIELD

Specific embodiments relate to systems and apparatus of writing data to multiple radio frequency storage devices on sheets of print media and more specifically to the simultaneous programming of columns of radio frequency tags embedded in cut sheets of print media as they traverses a print media pathway within a printer assembly thereby reducing the amount of time it would take to program the tags separately.

BACKGROUND OF THE INVENTION

Inkjet and laser printers have become commonplace equipment in most workplace and home computing environments. Today, many printers are multi-functional assemblies capable of printing on a large array of print media such as, for example, letterhead, envelopes and labels. A recent innovation in the printing industry involves the manufacturing of print media with embedded radio frequency signatures such as is possible with Radio Frequency Identification (RFID) tags. These tags, sometimes called "Smart Labels", may be used with a variety of existing printing methods and the embedded tags may be programmed with information that is of use to the user.

Such print media generally comprises a backing material (sometimes referred to as the "web") upon which a label is applied, with a RFID tag sandwiched in between the label and the backing material. There may be one or more labels on the web and the sheet, as presented, may be part label and part plain paper. In some cases, there may be more than one tag arrayed across the width and down the length of the media such that multiple columns and/or rows of tags are contained on the print media.

One of the benefits of printing labels on a cut-sheet printer such as a laser or inkjet printer is that the relatively wide format allows for multiple columns of labels to be used. The use of multiple columns improves the overall rate at which the labels can be printed. For labels with embedded RFID tags, this efficiency can also be attained if the RFID tags can be programmed at a rate that will not adversely effect printing speed.

Although existing RFID protocols allow for multiple tags within range of a single reader antenna, the programming of these tags is still performed one at a time. Since programming a single RFID tag takes a relatively significant amount of time, the task of efficiently programming multiple tags on a sheet of print media becomes the limiting factor in maintaining throughput in an RFID label printing system.

For these reasons and others, it is desirable to improve throughput when programming an array of tags using a radio frequency data programming system. A means of efficiently writing data to a plurality of radio frequency storage devices, such as multiple RFID tags, contained on print media would be advantageous.

BRIEF DESCRIPTIONS OF THE DRAWINGS

The present invention is illustrated by way of example and not limitation in the figures of the accompanying drawings in which like references indicate similar elements, and in which.

DETAILED DESCRIPTION

Figure 1:
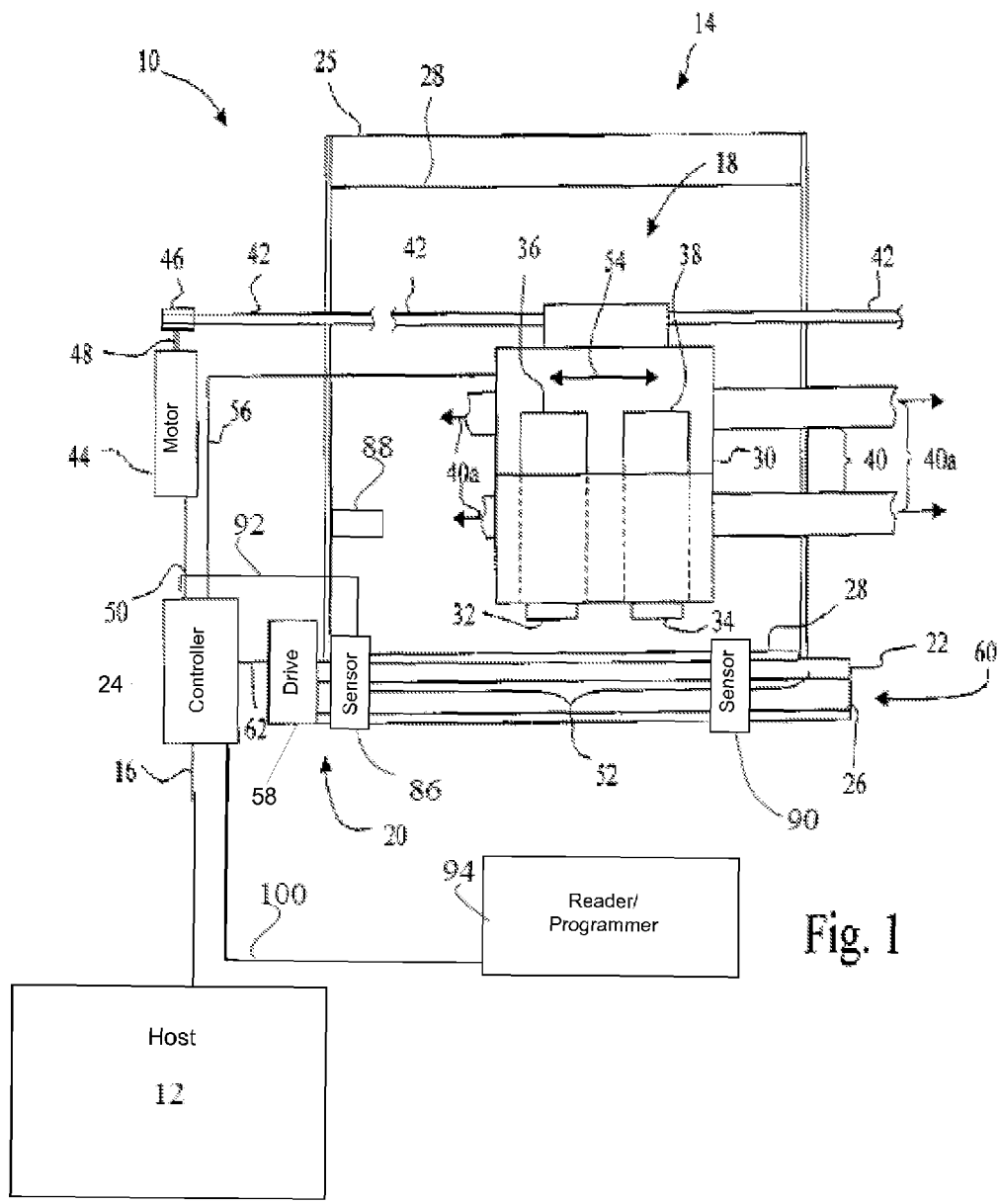
FIG. 1 shows a system for writing data to a plurality of data storage devices contained on print media according to one embodiment of the invention.

Referring now to the drawings and more particularly to FIG. 1, therein is shown a system 10 for writing data to multiple radio frequency data storage devices, such as RFID tags, contained on a cut sheet of print media according to one embodiment of the present invention. System 10 may include a printer assembly 14 such as, for example, an ink jet or laser printer or other image forming platform. For convenience, system 10 will be described in connection with an ink jet printer although it should be understood the system 10 of the invention may be implemented in other image forming platforms such as a laser or dye diffusion printer, for example.

Host 12 may be communicatively coupled to printer assembly 14 by way of communications link 16. Communications link 16 may be established by, for example, a direct connection, such as a cable connection, between printer assembly 14 and host 12; by a wireless connection; or by a network connection, such as for example, an Ethernet local area network (LAN) or a wireless networking standard, such as IEEE 802.11. Although not shown, host 12 may include a display, an input device such as a keyboard, a processor and associated memory. Resident in the memory of host 12 may be printer driver software which places print data and print commands in a format that can be recognized by printer assembly 14. The format can be, for example, a data packet including print data and printing commands for a given print request and may include a print header that identifies scan data. The printer driver software may also include print media information such as, for example, media type and size. In addition, such print media information may include the expected and predetermined location of radio frequency data storage devices, such as a plurality of RFID tags which have been placed on or embedded in the print media as "Smart" labels or other similar cut-sheet print media.

FIG. 1 shows that printer assembly 14 includes a printhead carrier system 18, a print media feed system 20, a mid-frame 22, a master controller 24, a print media source 25 and an exit tray 26. Print media source 25 is configured and arranged to supply individual sheets of print media 28 to print media feed system 20 which, in turn, further transports sheets of print media 28 during a printing operation.

Printhead carrier system 18 includes a printhead carrier 30 which may carry, for example, a color printhead 32 and black printhead 34. A color ink reservoir 36 is provided in fluid communication with color printhead 32 and a black ink reservoir 38 is provided in fluid communication with black printhead 34. Reservoirs 36, 38 may be located near respective printheads 32 and 34, which in turn may be assembled as respective unitary cartridges. Alternatively, reservoirs 36, 38 may be located remote from printheads 32, 34, e.g., off-carrier, and reservoirs 36, 38 may be fluidly interconnected to printheads 32, 34, respectively, by fluid conduits. Printhead carrier system 18 and printheads 32 and 34 may be configured for unidirectional printing or bi-directional printing.

Printhead carrier 30 is guided by a pair of guide rods 40. Alternatively, one of guide rods 40 could be a guide rail made of a flat material, such as metal. The axes 40a of guide rods 40 define a bi-directional-scanning path, also referred to as 40*a*, of printhead carrier 30. Printhead carrier 30 is connected to a carrier transport belt 42 that is driven by a carrier motor 44 by way of a driven carrier pulley 46. Carrier motor 44 has a rotating carrier motor shaft 48 that is attached to carrier pulley 46. Carrier motor 44 is electrically connected to print controller 24 via communications link 50. At a directive of print controller 24, printhead carrier 30 is transported, in a reciprocating manner, along guide rods 40. Carrier motor 44 can be, for example, a direct current motor or a stepper motor.

The reciprocation of printhead carrier 30 transports ink jet printheads 32 and 34 across the sheet of print media 28 along bi-directional scanning path 40*a* to define a print area 52 of printer assembly 14 as a rectangular region. This reciprocation occurs in a scan direction 54 that is parallel with bi-directional scanning path 40*a* and is also commonly referred to as the horizontal scanning direction. Printheads 32 and 34 are electrically connected to print controller 24 via communications link 56.

During each printing pass, i.e., scan, of printhead carrier 30, while ejecting ink from printheads 32 and/or 34, the sheet of print media 28 is held stationary by print media feed system 20. Before ink ejection begins for a subsequent pass, print media feed system 20 conveys the sheet of print media 28 in an incremental, i.e., indexed, fashion to advance the sheet of print media 28 into print area 52. Following printing, the printed sheet of print media 28 is delivered to print media exit tray 26. Print media feed system 20 includes a drive unit 58 coupled to a sheet handling unit 60. Drive unit 58 is electrically connected to print controller 24 via communications link 62, and provides a rotational force which is supplied to sheet handling unit 60.

As such, printer assembly 14 provides a print media pathway 110 for the transport of print media 28 from a paper source 25 to a designated print area 52. Printer assembly 14 may include a print media sensor 86 capable of detecting when print media 28 has reached a predetermined point along the print media pathway 110. Print media sensor 86 may be configured to detect the leading edge of the print media 28 as it is conveyed by the print media feed system 20 through the printer assembly 14. In addition to, or alternatively, the print media sensor 86 may detect the trailing edge of the print media 28. In this regard, the leading edge of the print media 28 is defined as the media edge which enters the printing device's print area 52 first and the trailing edge is equivalently to that edge which enters the print area 52 last.

Figure 2:
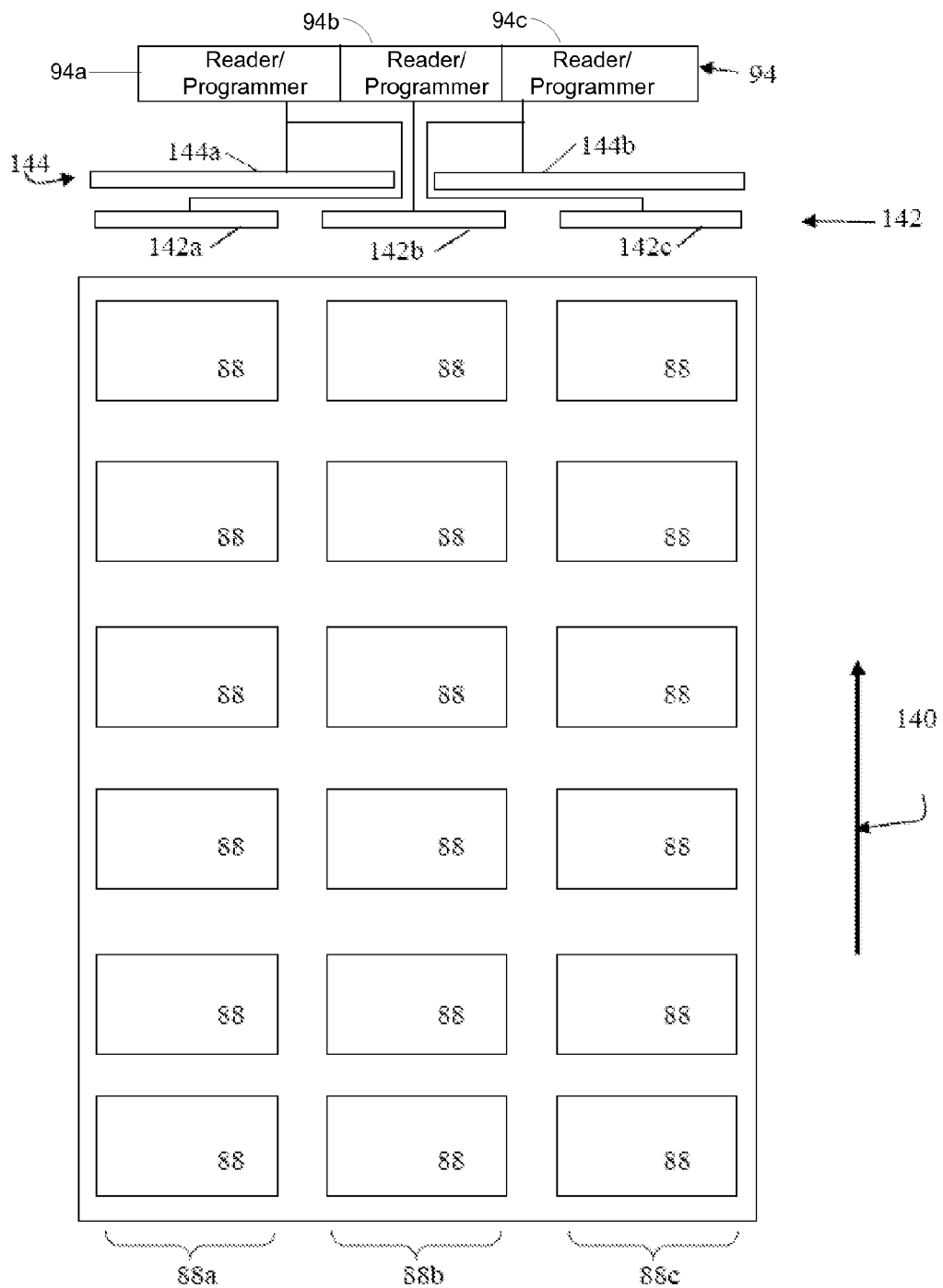
FIG. 2 shows a sheet of print media containing a plurality of radio frequency data storage devices arranged in columns.

The invention has particular application and provides particular advantages in the context of modern day image forming devices, such as print assembly 14 and other commercially available types of printer platforms, where print media, such as print media 28, contains multiple radio frequency storage devices, such as RFID tags, to which data can be written using one or more data programmers, such as an RFID reader/programmer with one or more antennas, for writing data to the radio frequency data storage devices. Such RFID reader/programmers are readily available and their details of operation and use are known to those of ordinary skill. The use of such reader/programmers to reduce programming time when writing data to multiple radio frequency data storage devices, however, is unique, novel and non-obvious. Referring to FIG. 2, therein is shown a cut sheet of print media 28 having a plurality of radio frequency data storage devices 88. The radio frequency data storage devices 88 can comprises RFID tags having memory for storing user desired information such as, for example, the address and identification of an intended recipient, order number, date of shipment and other types of label specific data. In general, radio frequency data storage devices 88 are arranged into columns which, in the examples shown in FIG. 2, consist of columns 88*a*, 88*b* and 88*c*. While media 28 shows three columns 88*a*, 88*b*, 88*c*, it should be understood that more or less columns may exist according to various media configurations all of which may be utilized with the invention.

Figure 3:
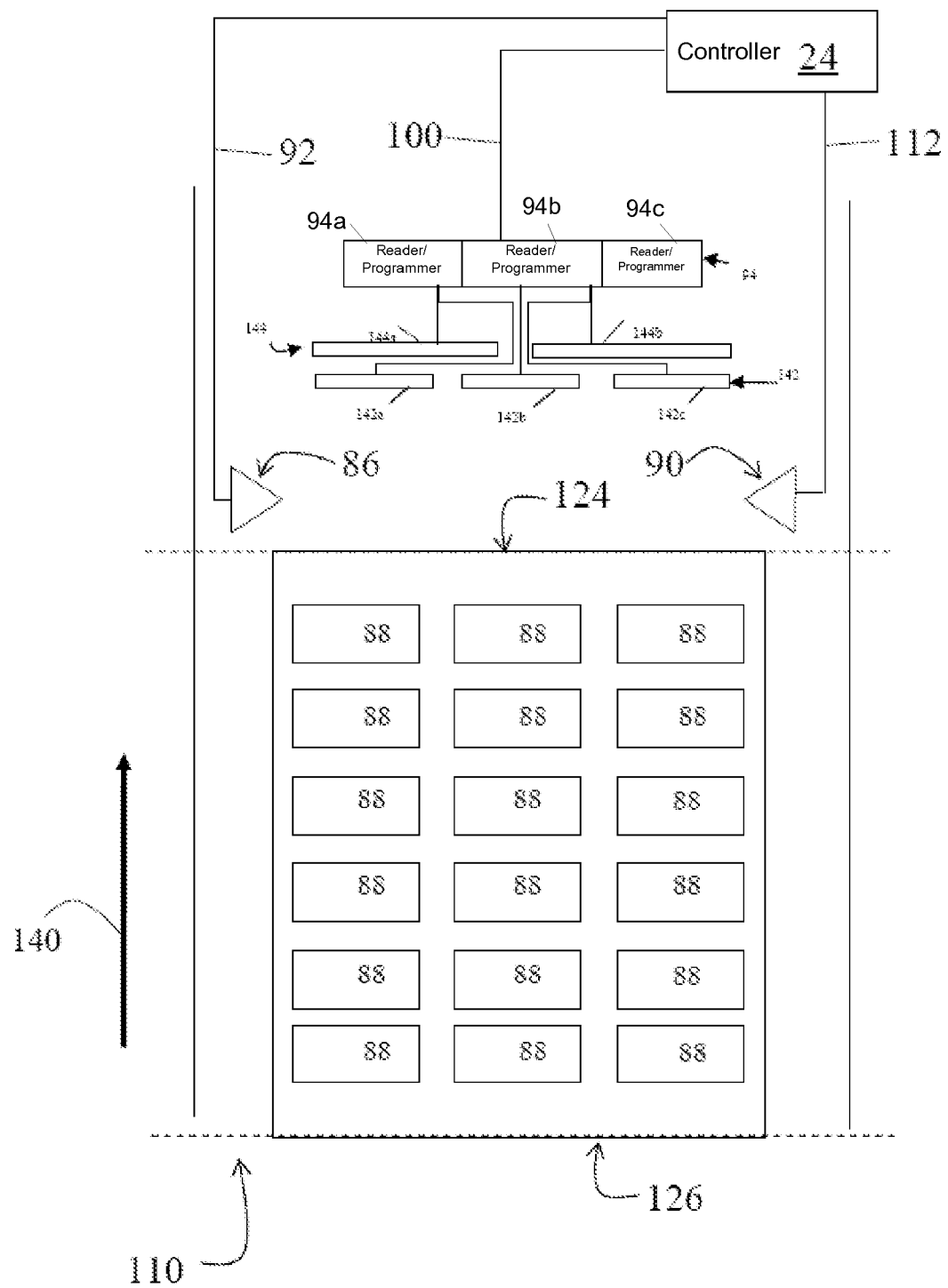
FIG. 3 shows the operation of a system for writing data to a plurality of data storage device according to the invention.

Referring to FIGS. 2 and 3, arrow 140 indicates the direction of travel of media 28 along a print media pathway such as print media pathway 110. As discussed above, one or more sensors arranged about a printer's print media pathway 110 may be used to determine and track the location of print media 28 as it passes through the printer's print area, such as print area 52. Such sensors may be arranged to "make" at the leading edge 124 of a sheet of print media and "break" at the trailing edge 126, providing a master controller, such as master controller 24, with an indication of the location of the print media at any given point along the printer's print media pathway 110. For this purpose, printer assembly 14 may include a second print media sensor 90 which functions like first print media sensor 86. In either configuration, i.e. one or two print media sensors, a communications link 92 is provided between the print media sensor 86 and the master controller 24.

Communications link 92 provides a means for print media sensor 86 to signal master controller 24 and thereby notify master controller 24 that a sheet of print media, such as print media 28, has been detected. A similar communications link (not shown) may be provided coupling the second print media sensor 90 to the master controller 24. In this way, the master controller 24 will know when the leading edge and/or trailing edge of the print media 28 traverses the print area 52 and/or a predetermined point along the print media pathway 110.

Thus, a plurality of radio frequency data storage devices 88 have been placed on or embedded in print media 28 at specific locations and arranged into columns 88*a*, 88*b*, 88*c*. A radio frequency data programming device 94, such as an RFID reader/programmer, may be placed about the printer assembly 14 in an area where it can write data to the radio frequency data storage devices 88 using known techniques. In practice, write operations can commence once print media 28 has reached a predetermined point along the print media pathway 110.

Since radio frequency data storage devices 88 are contained on print media 28, a radio frequency data programming device 94 can be used to write data to radio frequency data storage devices 88 using antennas arranged into antenna groups 142, 144. Thus, with the present invention multiple antennas are arrayed across the horizontal axis of the print media pathway 110 so that their positions roughly correspond to known or expected positions of the columns of radio frequency data storage devices, such as those located in columns 88*a*, 88*b*, and 88*c*. Preferably, each antenna in groups 142, 144 has a separate independent reader/programmer module associated with it with the master controller 24 routing data to each column of storage devices via the appropriate reader/programmer module. The existence of independent reader/programmers (i.e. reader/programmer modules) is illustrated by elements 94*a*, 94*b* and 94*c* of radio frequency programming device 94.

As print media passes beneath antenna groups 142, 144, data can be written to each of the devices 88 by simultaneous programming of devices in a row utilizing their associated antennas. This results in a net reduction of the overall programming time for each sheet of print media by the number of columns of devices. For example, in FIG. 2 print media 28 is shown to have three columns 88*a*, 88*b*, 88*c*, with each column having 6 devices arranged in 6 horizontal rows across the width of print media 28. As such, a total of eighteen (18) devices are contained on print media 28. If it takes an estimated 200 ms to write data to a device, programming all eighteen (18) devices would require 3.6 seconds if done separately, i.e. one device at a time. At the same time, by programming each row of devices simultaneously, the total amount of time necessary to write data to all eighteen (18) devices is reduced to 1.2 seconds. As such, the use of multiple antennas to simultaneously write data to more than one radio frequency data storage device on print media, such as print media 28, reduces the time required to write the data to the storage devices separately.

Master controller 24 of print assembly 14 may confirm if radio frequency data storage devices 88 contained on print media 28 are positioned as expected on print media 28. In one embodiment, radio frequency data programming device 94 uses the antenna associated with a column of devices to program devices in that column (which may consist of a plurality of individual reader/programmers, 94a:94c, for example for each antenna in a group). A master controller 24 provides the necessary process logic for routing data to the appropriate antenna based on the column position of a device to be programmed. Communications link 100 coupling radio frequency data programming device 94 to master controller 24 provides a signal pathway for this purpose.

Generally, there will be either an even number or odd number of columns on a given sheet of print media. The vast majority of these possibilities can be managed using two groups of antennas. For example, one antenna group 144 may comprise two (2) antennas 144a, 144b with two (2) reader/programmers 94a, 94c spaced to cover approximately half the width of the print media 28. The second antenna group 142 may comprise three (3) antennas 142a, 142b, 142c with three (3) reader/programmers 94a, 94b, 94c spaced to cover approximately one third the width of the print media 28. Thus, a total of three (3) reader/programmers can be used since two (2) reader/programmers can be used to drive either both group 144 antennas or drive two (2) of the group 142 antennas.

For any given print media configuration, it is possible to control data programming functions so that only one group of antennas may be used. The group of antennas to use may be selected based upon the arrangement of tags on the page as specified in the datastream command for the page to be printed. Thus, the antennas in group 144 can be used to write data (or program as the terms can be used interchangeably) the even-numbered columns of devices 88 (column 88b in FIG. 2) while the group 142 antennas can be used to program the odd-numbered columns of device 88 (columns 88a and 88c).

Figure 4:
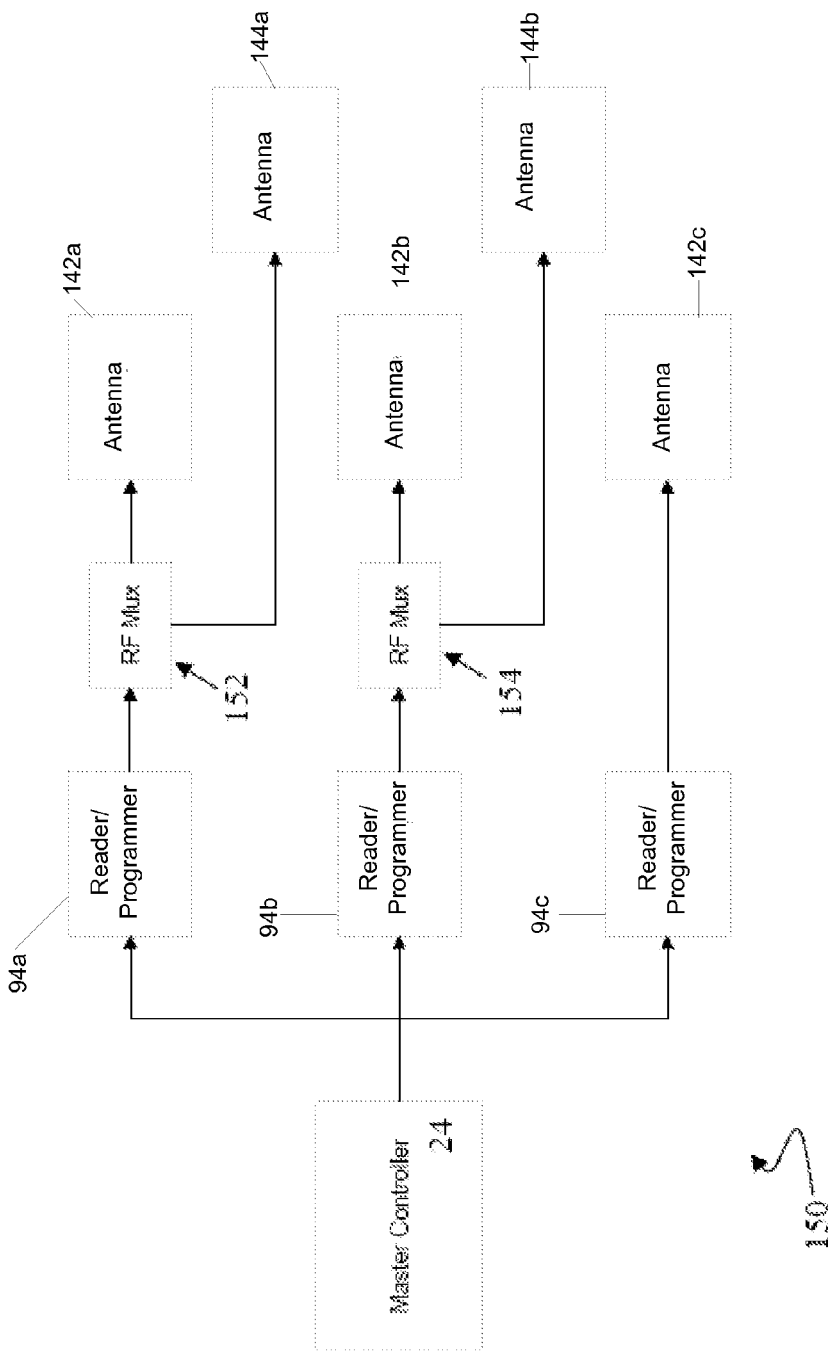
FIG. 4 is a simplified architectural block diagram of a system for writing data to a plurality of radio frequency data storage device contained on print media according to the invention.

FIG. 4 is a simplified architectural block diagram of a system, denoted generally as 150, for writing data to radio frequency storage devices contained on print media according to the invention. In particular, system 150 has a master controller 24 which is capable of directing data to a particular antenna, i.e. any one of 142a, 142b, 142c, 144a, or 144b, via reader/programmers 94a, 94b, 94c and RF multiplexers 152 and 154. In the event, a device is "visible" to more than one reader/programmer-antenna pair, the master controller 24 can decide which reader/programmer and antenna pair to use utilizing RF multiplexers 152 and 154. Alternatively, a reader/tag protocol can be devised to arbitrate between the reader/programmer and antenna pairs to be utilized for a specific write operation.

It should be understood that modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system comprising:
   a printer assembly with a print media pathway configured to receive print media comprising a plurality of radio frequency storage devices arranged in at least two columns arrayed across a width and down a length of said print media;
   at least one controller;
   two or more radio frequency antennas; and
   at least one data programmer for transmitting radio frequency signals via said radio frequency antennas, the at least one data programmer being controlled by the at least one controller;
   wherein said radio frequency antennas are arranged into at least two groups of antennas along an axis perpendicular to a print media direction of travel, each group of antennas being in communication with the at least one data programmer and controlled by the at least one controller such that a first group of the antenna groups communicates with print media having radio frequency storage devices arranged in N columns across the width of the print media, and a second group of antennas communicates with print media having radio frequency storage devices arranged in M columns across the width of the print media, wherein N and M are each greater than one and not equal to each other.

2. The system of claim 1 wherein the first of said groups contains two radio frequency antennas and the second of said groups contains three radio frequency antennas.

3. The system of claim 1 wherein the controller is operably coupled to said two groups of radio frequency antennas and configured to arbitrate which antenna group writes data to a particular radio frequency storage devices.

4. The system of claim 1 wherein said data programmer comprises separate reader/programmers for each of said one or more radio frequency antennas.

5. A radio frequency label printing system comprising:
   a printer assembly having a print media pathway configured to receive print media comprising a plurality of radio frequency tags arranged in at least two columns arrayed across a width and down the length of said print media;
   at least two radio frequency programmers having antennas arranged in at least two groups for writing data to said radio frequency tags;
   a controller operably coupled to said at least two radio frequency programmers for determining which group of antennas is to be used to write data to said radio frequency tags;
   wherein said controller is configured to cause said radio frequency programmers to simultaneously write data to radio frequency tags in a group;
   wherein each group of antennas is disposed across the print media pathway in a direction substantially perpendicular thereto and is used for substantially simultaneously writing data to print media having a distinct number of columns of radio frequency tags relative to a number of columns of radio frequency tags to which another antenna group is used for substantially simultaneously writing data.

6. The system of claim 5 wherein at least one of said radio frequency programmers is associated with each group of antennas, and each group of antennas is configured to route data to print media having a distinct number of columns of tags across a width thereof, relative to a number of columns of tags of print media to which another group of antennas is configured to route data.

7. The system of claim 5 wherein said radio frequency antennas are arranged into at least two groups of antennas, and wherein only one of said groups is configured to be activated at a time for writing data depending on the arrangement of said radio frequency tags on said media.

8. The system of claim 7 wherein each group comprises at least two antennas.

9. The system of claim 8 wherein at least one of said groups has at least three antennas.

10. The system of claim 5 further comprising a multiplexer coupled between the radio frequency programmers and the groups of antennas for selecting an appropriate antenna group.

11. Apparatus for writing data to radio frequency tags on print media comprising a plurality of radio frequency tags arranged in at least two columns arrayed across a width and down a length of said print media, said apparatus comprising:
a plurality of radio frequency antennas arranged in at least two groups;
a plurality of radio frequency programmers associated with said antennas, at least one radio frequency programmer being coupled to an antenna in each group; and
a controller configured to cause said radio frequency programmers to write data to said radio frequency tags contained on print media being fed through a print media pathway within a printer assembly, said data being substantially simultaneously written to said radio frequency tags in a row thereof;
wherein each antenna group is used to write data to said radio frequency tags in a row disposed across the print media in a direction substantially orthogonal to a direction of travel thereof, wherein each group of antennas has a different number of antennas such that each group is used to substantially simultaneously write data onto print media with a distinct number of columns of radio frequency tags appearing across the substantially orthogonal direction.

12. The apparatus of claim 11 wherein said radio frequency antennas comprises first and second groups of antennas, and wherein only one of said groups is configured to be activated at a time for writing data depending on the arrangement of said radio frequency tags on said media.

13. The apparatus of claim 12 wherein first and second ones of said plurality of radio frequency programmers utilize said first and second groups of antennas, respectively.

14. The apparatus of claim 13 further comprising at least one multiplexer between said first radio frequency programmer and antennas in the first and second antenna groups.

15. The system of claim 1, wherein the at least one data programmer is coupled to an antenna from the first group and an antenna from the second group.

16. The system of claim 1, further comprising at least one radio frequency multiplexer coupled between the at least one data programmer and an antenna from the first group and between the at least one data programmer and an antenna from the second group.

17. The system of claim 1, wherein the first antenna group has a number of antennas which is not equal to a number of antennas in the second antenna group.

18. The system of claim 1, wherein the first group of antennas substantially simultaneously communicates with radio frequency storage devices arranged in a row on a print media.

19. The system of claim 5, wherein each antenna group has a distinct number of antennas relative to a number of antennas in another antenna group.

20. The system of claim 5, wherein each of the at least two radio frequency programmers is coupled to an antenna from each antenna group.

21. A system, comprising:
a printer assembly having a print media pathway configured to receive print media comprising a plurality of radio frequency tags arranged in at least two columns arrayed across a width and down the length of the print media;
at least two radio frequency communication modules having antennas arranged in at least two groups for communicating data with the radio frequency tags;
at least one multiplexer disposed between at least one of the radio frequency communication modules and an antenna in each of the at least two antenna groups; and
a controller operably coupled to the at least two radio frequency communication modules for determining which group of antennas is to be used to communicate data with the radio frequency tags, wherein the controller is configured to cause the radio frequency communication modules to substantially simultaneously communicate data with radio frequency tags on the print media, the at least one of the radio frequency communication modules being used to communicate data regardless of the antenna group used.

22. The system of claim 21, wherein the at least one multiplexer comprises a plurality of multiplexers and the at least one radio frequency communication modules comprises a plurality of radio frequency communication modules, each multiplexer being coupled between a distinct radio frequency communication module and an antenna from the at least two antenna groups.

23. The system of claim 21, wherein each group of antennas is disposed across the print media pathway in a direction substantially perpendicular thereto and is used to substantially simultaneously communicate data with print media having a distinct number of columns of radio frequency tags relative to a number of columns of radio frequency tags to which another antenna group is used to substantially simultaneously communicate data.

* * * * *